United States Patent [19]

Takahashi

[11] Patent Number: 4,599,065
[45] Date of Patent: Jul. 8, 1986

[54] APPARATUS FOR DIMENSIONING SLIDE FASTENER COUPLING ELEMENTS

[75] Inventor: Kihei Takahashi, Uozu, Japan

[73] Assignee: Yoshida Kogyo K. K., Tokyo, Japan

[21] Appl. No.: 733,885

[22] Filed: May 14, 1985

[30] Foreign Application Priority Data

May 17, 1984 [JP] Japan .................. 59-99556

[51] Int. Cl.[4] .............................. B29D 5/00
[52] U.S. Cl. .................... 425/394; 425/545; 425/814; 425/DIG. 34
[58] Field of Search ....... 425/383, 394, 545, DIG. 34, 425/814

[56] References Cited

U.S. PATENT DOCUMENTS 4,336,220 6/1982 Takahashi .............. 425/814
4,406,849 9/1983 Takahashi et al. ............ 264/167

FOREIGN PATENT DOCUMENTS 42-1939 1/1967 Japan .

Primary Examiner—J. Howard Flint, Jr.
Attorney, Agent, or Firm—Hill, Van Santen, Steadman & Simpson

[57] ABSTRACT

A row of slide fastener coupling elements of synthetic resin or metal is pressed between a pair of first and second presser rolls having first and second confronting presser surfaces engaging legs of the coupling elements. The first and second presser surfaces have closest confronting portions spaced from each other by a distance equal to the width of each of the coupling elements. The second presser roll is displaceable with respect to the first presser roll to vary the distance. The first presser roll has a spur gear held in mesh with a pin gear on the second presser roll. The first and second presser rolls can be rotated in synchronism by the spur gear and the pin gear even when the second presser roll is displaced relatively to the first presser roll. The first and second presser rolls also have partition ridges for meshing engagement with the legs to keep them spaced apart at equal intervals. One of the first and second presser rolls has a third presser surface for engagement with coupling heads. Another presser roll has a fourth presser surface in confronting relation to the third presser surface for pressing the coupling elements toward the third presser surface.

7 Claims, 21 Drawing Figures

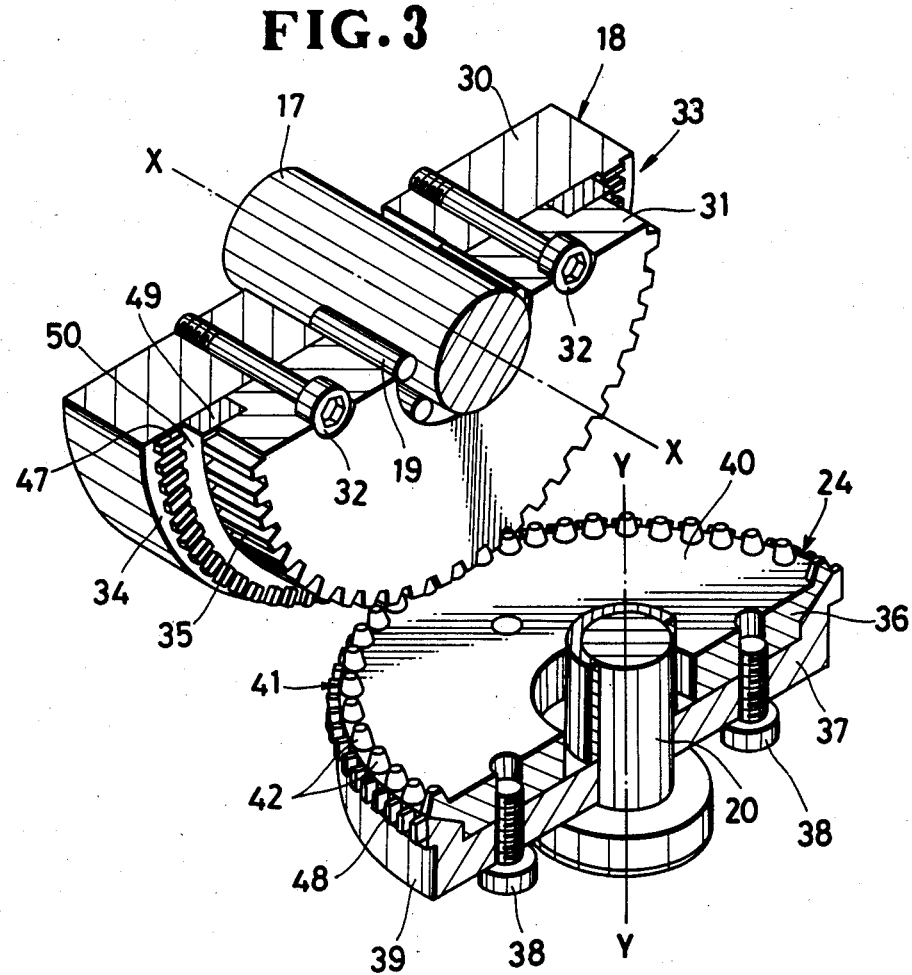

APPARATUS FOR DIMENSIONING SLIDE FASTENER COUPLING ELEMENTS

BACKGROUND OF THE INVENTION

1. Field of the Invention

The present invention relates to an apparatus for dimensioning individual slide fastener coupling elements of synthetic resin or metal.

2. Description of the Prior Art

There are known apparatus for dimensioning slide fastener coupling elements in apparatus for mounting such slide fastener coupling elements for forming such slide fastener coupling elements of synthetic resin. One known dimensioning apparatus includes a pair of presser rolls as disclosed in Japanese Patent Publication No. 42-1939, published Jan. 28, 1967. U.S. Pat. No. 4,406,849, patented Sept. 27, 1983 shows another dimensioning apparatus which has a presser wheel and a presser die. The presser rolls or the presser wheel is driven through a train of ordinary gears such as spur gears or bevel gears.

When it is necessary to adjust or vary the desired dimensions to which slide fastener coupling elements are to be shaped, it has been customary to transversely move the rotatable shafts of the presser rolls or the rotatable shaft of the presser wheel. Movement of the rotatable shafts however displaces meshing gear teeth toward or away from each other, causing a backlash or excessively forced meshing engagement between the gear teeth. Therefore, the presser rolls or the presser wheel fails to rotate in synchronism with other rotating components or fails to rotate smoothly. The prior dimensioning apparatus are also disadvantageous in that the range of adjustment is small, and slide fastener coupling elements cannot be easily set in place.

SUMMARY OF THE INVENTION

It is an object of the present invention to provide an apparatus for dimensioning slide fastener coupling elements, the apparatus having positionally adjustable roll means for accurately shaping the coupling elements to desired dimensions such as a width and a length.

Another object of the present invention is to provide an apparatus for dimensioning slide fastener coupling elements, the apparatus having positionally adjustable presser rolls smoothly rotatable in synchronism, while engaging the coupling elements, for dimensioning the coupling elements without scratching or otherwise damaging them.

Still another object of the present invention is to provide a coupling element dimensioning apparatus including dimensioning rollers having means for preventing coupling elements legs from being positionally displaced to keep the legs spaced apart at desired intervals or pitches.

According to the present invention, an apparatus for dimensioning a row of slide fastener coupling elements includes a pair of first and second presser rolls having first and second confronting presser surfaces, respectively, for engaging legs of the coupling elements. The first and second presser surfaces have closest confronting portions for positioning the coupling elements therebetween, the closest confronting portions being spaced from each other by a first distance equal to the width of each of the coupling elements between outer surfaces of the legs thereof. The second presser roll is displaceable with respect to the first presser roll to vary the first distance. The first presser roll has a spur gear held in mesh with a pin gear on the second presser roll. The first and second presser rolls can be rotated in synchronism through meshing engagement of the spur gear and the pin gear even when the second presser roll is displaced relatively to the first presser roll. The first and second presser rolls also have partition ridges for meshing engagement with the legs to keep them spaced apart at equal intervals. One of the first and second presser rolls has a third presser surface for engagement with coupling heads of the coupling elements. Another presser roll has a fourth presser surface confronting the third presser surface for pressing the coupling elements toward the third presser surface. The third and fourth presser surfaces have closest confronting portions for positioning the coupling elements therebetween, the closest confronting portions being spaced from each other by a second distance equal to the length of each of the coupling elements between the coupling head end and the ends of the legs. The presser roll with the fourth presser surface is displaceable with respect to the first presser roll to vary the second distance.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is an enlarged fragmentary perspective view of first and second presser rolls in the dimensioning apparatus shown in FIG. 1;

DETAILED DESCRIPTION

Figure 1:
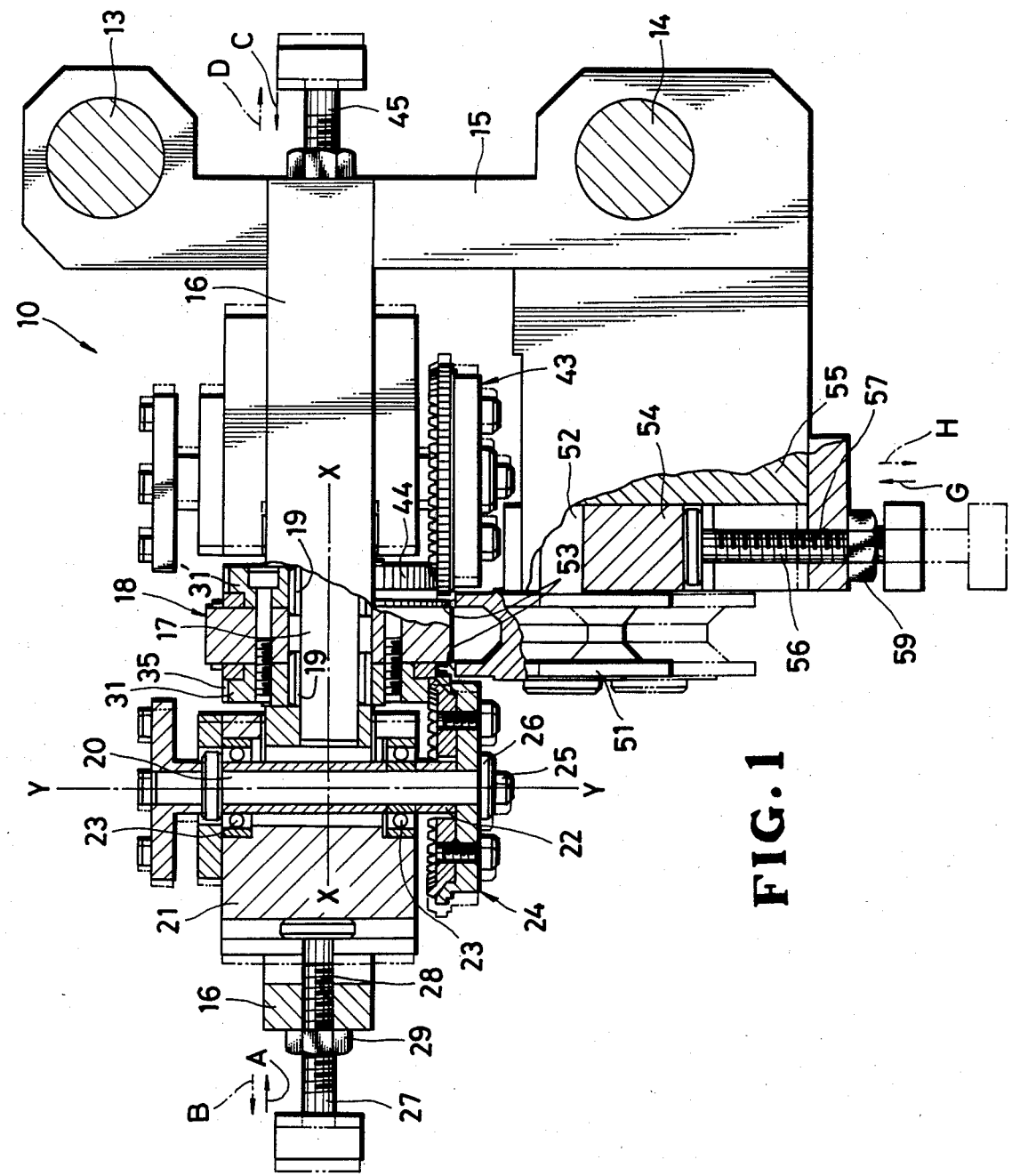
FIG. 1 is a front elevational view, partly in cross section, of a dimensioning apparatus according to an embodiment of the present invention.

The principles of the present invention are particularly advantageous when embodied in an apparatus for dimensioning slide fastener coupling elements, generally designated at 10 in FIG. 1.

Figure 2:
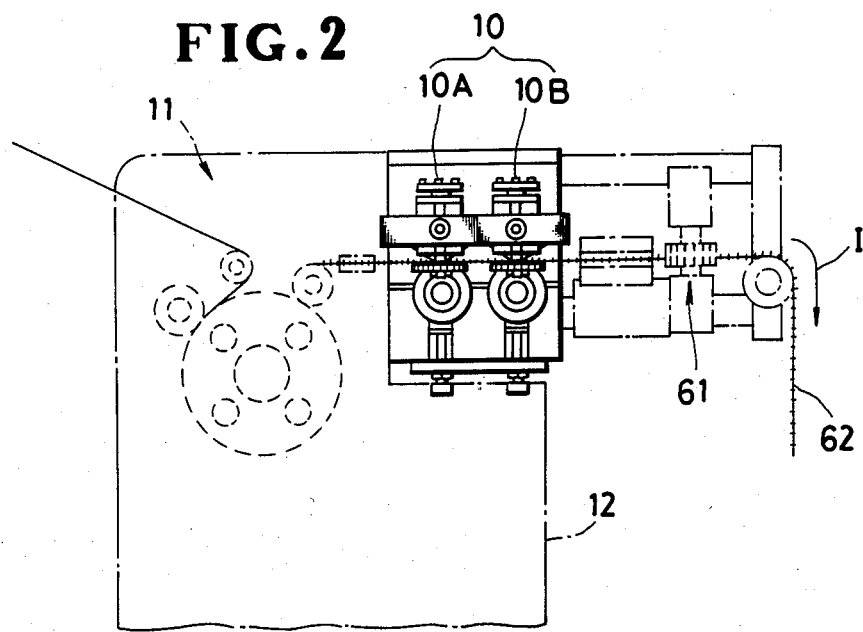
FIG. 2 is a schematic side elevational view of the dimensioning apparatus of FIG. 1 incorporated in an apparatus for forming slide fastener coupling elements.

As shown in FIG. 2, the dimensioning apparatus 10 is shown as coupled to an apparatus 11 for forming slide fastener coupling elements of synthetic resin. The dimensioning apparatus 10 includes two units 10A, 10B disposed at a discharge end of the apparatus 11 along a discharge path for the formed coupling elements. The dimensioning apparatus 10 may have only one unit if the formed coupling elements have no tendency to spring back after they have been shaped to the required dimensions.

Since the two units 10A, 10B are identical in construction, only one of these units 10A, 10B will be described hereinbelow. As shown in FIG. 1, the apparatus 11 (FIG. 2) for forming slide fastener coupling elements has a frame 12 (FIG. 2) on which there are mounted support rods 13, 14 connected to an arm 15. To the arm 15, there is fixed a bracket or base 16 on which a first horizontal shaft 17 is rotatably supported. A first presser roll 18 is rotatably mounted by a pair of roller bearings 19 on the first shaft 17.

A second vertical shaft 20 is rotatably mounted on a slide block 21 by a pair of ball bearings 23, 23, the second vertical shaft 20 being covered with a sleeve 22. The slide block 21 is mounted on the bracket 16 for sliding movement in the axial direction of the first horizontal shaft 17. As shown in FIG. 3, the first horizontal and second vertical shafts 17, 20 extend in a common plane and have respective central axes X—X, Y—Y extending perpendicularly to each other. A second presser roll 24 is fixed to an axial end of the second vertical shaft 20 by means of a screw 25 with a washer 26 interposed between the screw 25 and the second presser roll 24. A screw rod 27 rotatably mounted on the slide block 21 is threaded in an internally threaded hole 28 defined in the bracket 16, the screw rod 27 having an axis parallel to the first horizontal shaft 19. By turning the screw rod 27 to move the same axially, the slide block 21 and hence the second vertical shaft 20 can be moved toward and away from the first horizontal shaft 17 in the directions of the arrows A, B. The screw rod 27 can be fixed in position with respect to the bracket 16 by a lock nut 29.

As illustrated in FIG. 3, the first presser roll 18 comprises a first disk or wheel 30 and a second disk or wheel 31 that are concentrically fastened together by a pair of screws 32. The first presser roll 18 has an annular recess 33 in an entire circumferential edge thereof facing the second vertical shaft 20. The annular recess 33 is defined by an annular step formed by a cross-sectionally L-shaped wall of the first disk 30 and the second disk 31, the second disk 31 being smaller in diameter than the first disk 30. The first disk 30 has an annular end face 34 serving as a first presser surface lying perpendicularly to the first horizontal shaft 17. The second disk 31 has a circumferential surface lying parallel to the first horizontal shaft 17 and shaped as a spur gear 35 composed of gear teeth each having a trapezoidal cross section. As shown in FIG. 1, the first presser roll 18 also includes a third disk or wheel 31' attached by the screws 32 to the first disk 30 remotely from the second disk 31. The third disk 35 is of an identical external structure to that of the second disk 31. Therefore, the first presser roll 18 has two annular recesses 33 on its axially opposite sides.

As shown in FIG. 3, the second presser roll 24 is composed of a fourth disk or wheel 36 and a fifth disk or wheel 37 connected concentrically to each other by a plurality of screws 38. The second presser roll 24 has a circumferential surface 39 serving as a second presser surface lying in confronting relation to the first presser surface 34 of the first presser disk 18. The second presser roll 24, or the fourth disk 36 thereof, has an end face 40 facing the first horizontal shaft 17 parallel thereto and an outer peripheral marginal edge constructed as a pin gear 41 composed of pin teeth 42 each having a frustoconical shape and projecting parallel to the second vertical shaft 20. The pin gear 41 is held in mesh with the spur gear 35.

As illustrated in FIG. 1, a third presser roll 43 is rotatably supported on the bracket 16 in horizontally spaced relation to the second presser roll 24, the third presser roll 43 being identical in construction to the second presser roll 24. Thus, the third presser roll 43 has a circumferential surface confronting the other recess 33 in the first presser roll 18 and a pin gear meshing with another spur gear 44 of the first presser roll 18, as shown in FIG. 1. The third presser roll 43 is movable in the directions of the arrows C, D by means of a screw rod 45. The first, second, and third presser rolls 18, 24, 43 operate in synchronism for processing two rows of slide fastener coupling elements simultaneously to dimension them, as described later on.

As shown in FIG. 3, an annular array of partition ridges 47 spaced at equal intervals projects from the first presser surface 34 into the recess 33, and another annular array of partition ridges 48 spaced at equal intervals projects from the second presser surface 39 toward the partition ridges 47. Between the first and second disks 30, 31, there is disposed a bearing ring 49 having an outer circumferential surface serving as a third presser surface 50 extending along the partition ridges 47 perpendicularly to the first and second presser surfaces 34, 39.

As shown in FIG. 1, a fourth presser roll 51 is rotatably supported by a third horizontal shaft 52 and has a pair of axially spaced circumferential surfaces or fourth presser surfaces 53 each disposed adjacent to the first, second, and third presser surfaces 34, 39, 50. The third horizontal shaft 52 extends substantially parallel to the first horizontal shaft 17 and is suported on a slide block 54 slidably supported on a bracket 55 fixed to the support rod 14. The slide block 54 is slidable in the axial direction of the second vertical shaft 20 by a screw rod 56 threaded in an internally threaded hole 57 defined in the bracket 55. The slide block 54 and hence the third horizontal shaft 52 are therefore movable in the directions of the arrow G, H by turning the screw rod 56, which can thereafter be locked against rotation by a lock nut 59.

The first, second, third, and fourth presser rolls 18, 24, 43, 51 are not positively driven, but are caused to rotate by two rows of slide fastener coupling elements 62 (FIG. 2) which are successively formed by the apparatus 11 and discharged by a withdrawal device 61 through the units 10A, 10B.

Figure 4A:
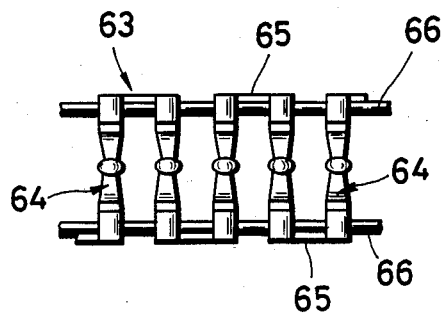
FIG. 4A is an enlarged fragmentary plan view of a slide fastener coupling element blank.
Figure 4B:
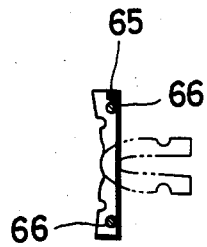
FIG. 4B is an enlarged side elevational view of the slide fastener coupling element blank shown in FIG. 4A.
Figure 4C:
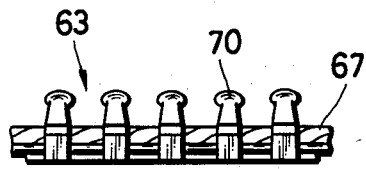
FIG. 4C is an enlarged fragmentary plan view of a slide fastener coupling element assembly formed from the blank of FIG. 4A.
Figure 4D:
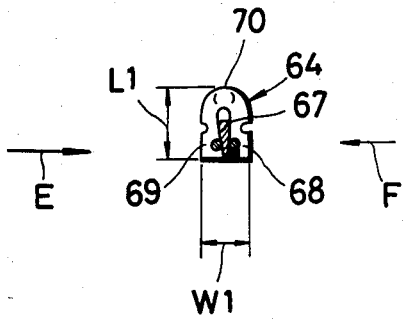
FIG. 4D is an enlarged side elevational view of the slide fastener coupling element assembly of FIG. 4C.
Figure 4E:
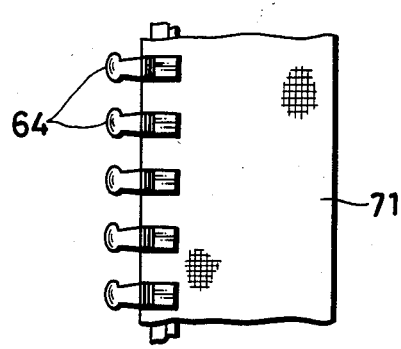
FIG. 4E is an enlarged fragmentary plan view of a slide fastener stringer with the slide fastener coupling element assembly of FIG. 4C.

FIGS. 4A through 4E show one form of slide fastener coupling elements which can be dimensioned by the dimensioning apparatus of the present invention. As shown in FIG. 4A, a coupling element assembly 63 comprises a plurality of parallel continuous coupling elements 64 of synthetic resin interconnected by connectors 65 in a zigzag configuration, the coupling elements 64 being also connected by a pair of connecting cords 66. The coupling element assembly 63 is bent into a cross-sectionally U-shape as indicated by the two-dot-and-dash lines in FIG. 4B, and combined with a core cord 67 inserted between legs 68, 69 of each of the coupling elements 64, as illustrated in FIGS. 4C and 4D. The legs 68, 69 of the coupling element 64 are interconnected by a coupling head 70. The formed coupling element 64 has a thickness W1 between outer surfaces of the legs 68, 69 and a length L1 between an end of the coupling head 70 and ends of the legs 68, 69. The thickness W1 and the length L1 are controlled by the dimensioning apparatus 10 of the present invention. The coupling elements 64 dimensioned properly by the dimensioning apparatus 10 are woven into a longitudinal edge of a slide fastener stringer tape 71, as shown in FIG. 4E.

Figure 5A:
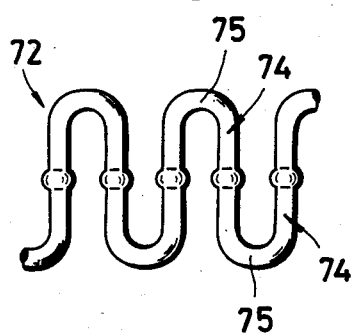
FIG. 5A is an enlarged fragmentary plan view of another slide fastener coupling element blank.
Figure 5B:
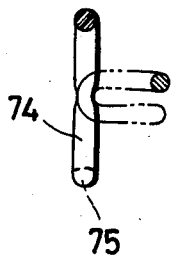
FIG. 5B is an enlarged side elevational view of the slide fastener coupling element blank shown in FIG. 5A.
Figure 5E:
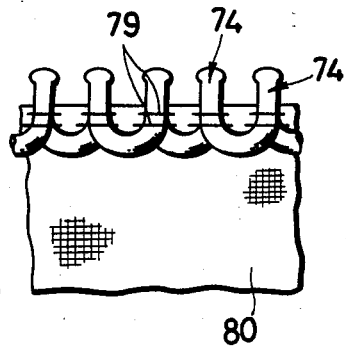
FIG. 5E is an enlarged fragmentary plan view of a slide fastener stringer with the slide fastener coupling element assembly of FIG. 5C.
Figure 5C:
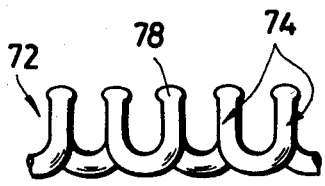
FIG. 5C is an enlarged fragmentary plan view of a slide fastener coupling element assembly formed from the blank of FIG. 5A.
Figure 5D:
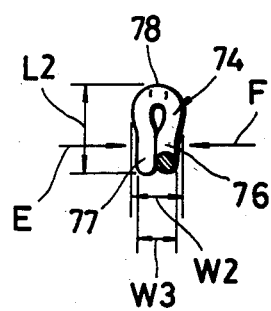
FIG. 5D is an enlarged side elevational view of the slide fastener coupling element assembly of FIG. 5C.

FIGS. 5A through 5E illustrate another form of slide fastener coupling elements. As shown in FIG. 5A, a coupling element assembly 72 is composed of continuous coupling elements 74 of synthetic resin having a meandering or zigzag pattern, the coupling elements 74 being interconnected by connectors 75. The coupling element assembly 72 is bent about a longitudinal central axis into a U-shaped cross section as indicated by the two-dot-and-dash lines in FIG. 5B. Each of the bent coupling elements 74 has a pair of legs 76, 77 interconnected by a coupling head 78 as shown in FIGS. 5C and 5D. The coupling element 74 has illustrated dimensions, that is, thicknesses W2, W3 and a length L2, controlled by the dimensioning apparatus of the invention. The dimentioned coupling elements 74 are sewn by sewing threads 79 to a slide fastener stringer tape 80 along a longitudinal edge thereof.

Figure 6A:
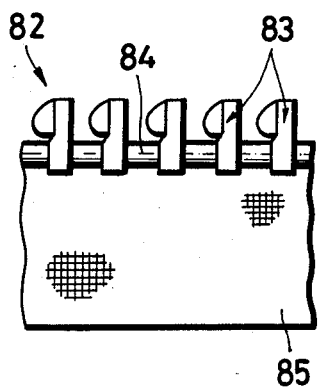
FIG. 6A is an enlarged fragmentary plan view of a slide fastener stringer with still another slide fastener coupling element assembly.
Figure 6B:
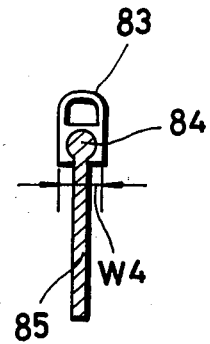
FIG. 6B is an enlarged transverse cross-sectional view of the slide fastener stringer illustrated in FIG. 6A.

FIGS. 6A and 6B show an assembly 82 of discrete slide fastener coupling elements 83 of metal mounted by staking on a reinforcing cord 84 on a longitudinal edge of a slide fastener stringer tape 85. The dimensioning apparatus of the invention controls a thickness W4 of the coupling elements 83.

Figure 7:
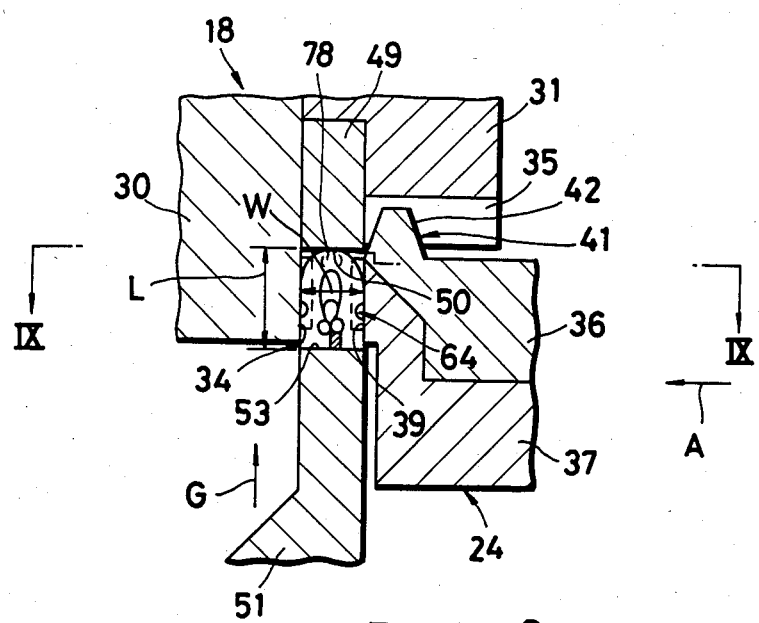
FIG. 7 is an enlarged fragmentary cross-sectional view of the presser rolls in the apparatus of FIG. 1 as they operate to dimension a slide fastener coupling element shown in FIG. 4D.

The first and second presser rolls 18, 24 serve to press the legs of the coupling elements with the first and second presser surfaces 34, 39 to achieve the prescribed widths W1, W2, W3, W4. The first and second presser surfaces 34, 39 therefore have closest confronting portions spaced apart from each other by a distance W equal to one of the widths W1, W2, W3, W4, as illustrated in FIG. 7.

The third and fourth presser surfaces 50, 53 have closest confronting portions spaced apart from each other by a distance L which is equalized to one of the lengths L1, L2 of the coupling elements.

Operation of the dimensioning apparatus 10 is as follows.

Figure 8:
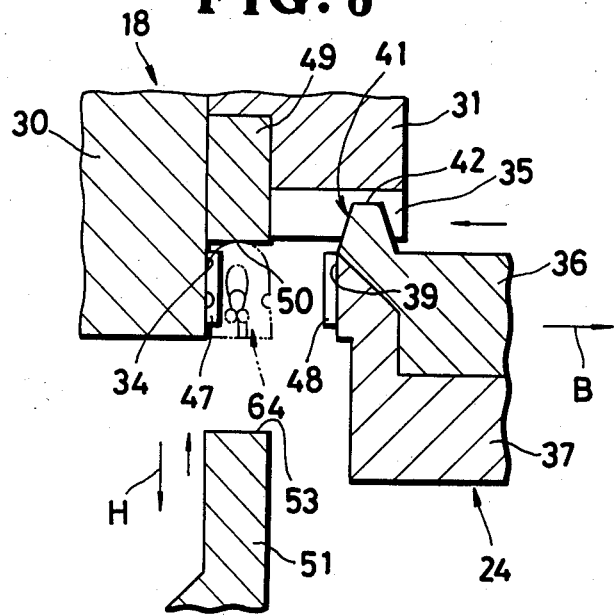
FIG. 8 is an enlarged fragmentary cross-sectional view of the presser rolls shown in FIG. 7 as they are spaced apart from each other.

First, dimensioning of the coupling elements 64 shown in FIGS. 4C and 4D will be described. The dimensioning apparatus 10 can process two rows of such coupling elements 64 to dimension the same simultaneously. Since the two rows of the coupling elements are dimensioned in the same manner, however, the processing of only one row of the coupling elements will be described in detail. The screw rods 27, 56 are turned about their own axes to slide the slide blocks 21, 54 and hence the second and third shafts 20, 52 in the directions of the arrows B, H, respectively. The second and fourth presser rolls 24, 51 are moved from the positions of FIGS. 1 and 7 away from the first presser roll 18 into the positions indicated by the two-dot-and-dash lines in FIG. 1 or the positions of FIG. 8, in which the first, second, third, and fourth presser surfaces 34, 39, 50, 53 are spaced from each other at increased distances. The row of the coupling elements 64 is then inserted between the first, second, third, and fourth presser surfaces 34, 39, 50, 53.

Thereafter, the screw rods 27, 56 are turned in opposite directions to slide the slide blocks 21, 54 in the directions of the arrows A, G, respectively, to move the second and fourth presser rolls 24, 51 toward the first presser roll 18, until the first through fourth presser surfaces 34, 39, 50, 53 are spaced at the distances L, W from the confronting presser surfaces, as illustrated in FIG. 7.

As the coupling elements 64 are fed along in the direction of the arrow I by the withdrawal device 61 (FIG. 2), the first, second, and fourth presser rolls 18, 24, 51 are rotated by the coupling elements 64. At this time, the first and second presser rolls 18, 24 are synchronously rotated by meshing engagement between the spur gear 35 and the pin gear 41.

Figure 9:
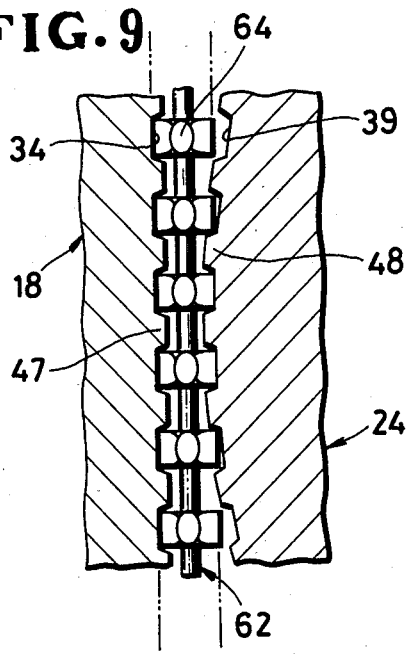
FIG. 9, appearing with FIG. 2, is a cross-sectional view taken along line IX—IX of FIG. 7.

The coupling elements 64, as they move through the first, second, and fourth presser rolls 18, 24, 51, are pressed by the first through fourth presser surfaces 34, 39, 50, 53 to the prescribed dimensions W1, L1. At this time, the partition ridges 47, 48 mesh with the coupling elements 64 (FIG. 9) to prevent the legs 68, 69 from being positionally displaced under forces applied in the directions of the arrows E, F (FIG. 4D), so that the legs 68, 69 will be spaced accurately at equal intervals or pitches. In addition, the coupling heads 70 are held against the third presser surface 50 while the ends of the legs 68, 69 are held against the fourth surface 53. Accordingly, the legs 68, 69 are prevented by the third and fourth presser surfaces 50, 53 from being longitudinally displaced in position under the forces imposed in the directions of the arrows E, F (FIG. 4D). Inasmuch as the first and second presser rolls 18, 24 are rotated in synchronism, the first and second presser surfaces 34, 39 are also rotated in synchronism. Therefore, the pressed surfaces of the coupling elements 64 are not subjected to undesired scratches or damages which would otherwise result from asynchronous rotation of the first and second presser surfaces 34, 39. The meshing engagement between the spur gear 35 and the pin gear 41 permits them to remain uniformly intermeshed without wobbling or forced meshing engagement even when the second presser roll 24 is axially displaced in the directions of the arrows A, B (FIG. 1). Accordingly, the first and second presser rolls 18, 24 are allowed to rotate smoothly and uniformly. When the first, second, and fourth presser rolls 18, 24, 51 are relatively displaced for adjusting their spacings while the coupling elements 64 are being dimensioned, the first and second presser rolls 18, 24 rotate smoothly and uniformly in complete synchronism as the pin gear 41 remains in mesh with the spur gear 35.

Figure 10:
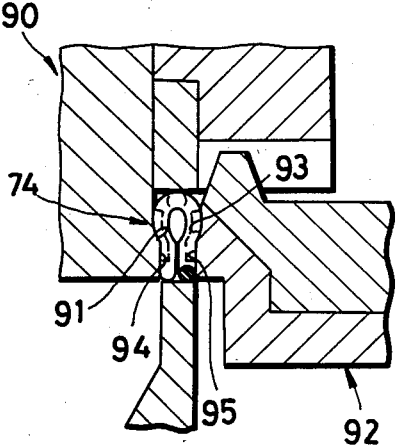
FIG. 10, appearing with FIG. 2, is an enlarged fragmentary cross-sectional view of presser rolls according to another embodiment of the present invention.

FIG. 10 shows a dimensioning apparatus according to another embodiment for dimensioning the coupling elements 74 as shown in FIGS. 5A through 5D. The dimensioning apparatus of FIG. 10 includes a first presser roll 90 having a first presser surface 91 and a second presser roll 92 having a second presser surface 93 facing the first presser surface 91. The first and second presser surfaces 91, 93 have raised portions 94, 95 projecting toward each other. The first and second presser surfaces 91, 93 are spaced from each other by a distance equal to the width W2 (FIG. 5D), and the raised portions 94, 95 are spaced from each other by a distance equal to the width W3. The other structural details of the dimensioning apparatus shown in FIG. 10 are the same as those of the dimensioning apparatus illustrated in FIGS. 1, 3, 7, and 8.

Figure 11:
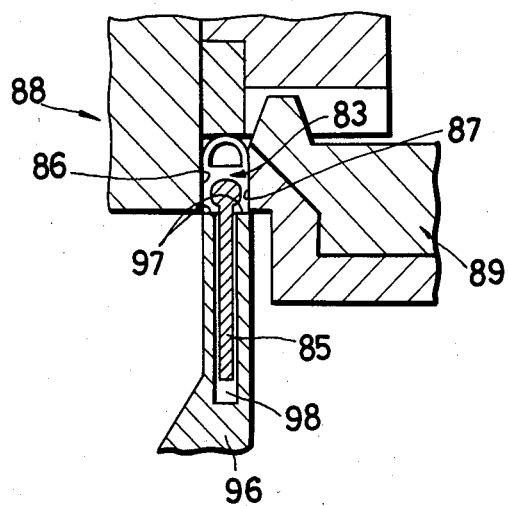
FIG. 11 is an enlarged fragmentary cross-sectional view of presser rolls according to still another embodiment of the present invention.

According to still another embodiment shown in FIG. 11, a dimensioning apparatus is constructed for dimensioning the coupling elements 83 illustrated in FIGS. 6A and 6B. The dimensioning apparatus includes a third presser roll 96 having a fourth presser surface 97 and a slot 98 opening radially outwardly for receiving the slide fastener tape 85 therein. For dimensioning the coupling elements 83 of metal, first and second presser surfaces 86, 87 of first and second presser rolls 88, 89 require no partition ridges.

Figure 12:
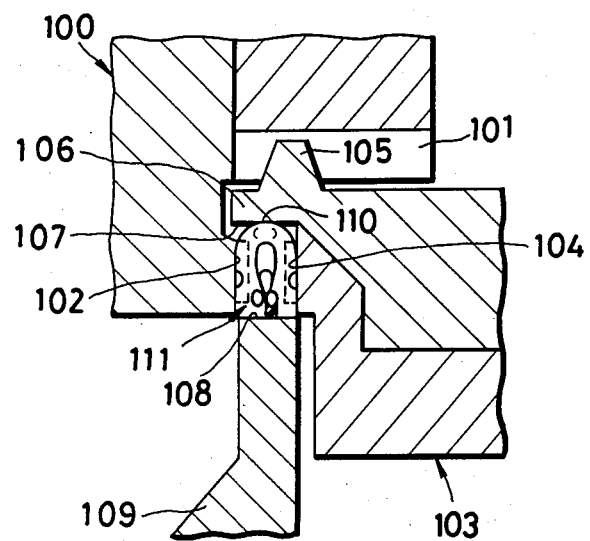
FIG. 12 is an enlarged fragmentary cross-sectional view of presser rolls according to a still further embodiment of the present invention.

FIG. 12 shows a dimensioning apparatus according to a still further embodiment of the present invention. The dimensioning apparatus comprises a first presser roll 100 having a spur gear 101 and a first presser surface 102, a second presser roll 103 having a second presser surface 104 confronting the first presser surface 102. The second presser roll 103 also has a pin gear 105 and a radially outwardly projecting flange 106 having a third presser surface 107 facing away from the pin gear 105 toward a fourth presser surface 108 of a third presser roll 109. In operation, the coupling heads 110 of coupling elements 111 are pressed against the third presser surface 107 by the fourth presser surface 108 of the third presser roll 109 which engages the legs of the coupling elements 111.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An apparatus for dimensioning slide fastener coupling elements, comprising:
   (a) a base;
   (b) a pair of first and second shafts rotatably mounted on said base and extending in a common plane and transversely to each other;
   (c) a first presser roll rotatably supported on said first shaft and having a circumferential wall of a substantially L-shaped cross section composed of a first presser surface lying transversely to said first shaft and a circumferential surface lying parallel to said first shaft and comprising a spur gear;
   (d) a second presser roll rotatably mounted on said second shaft and having a circumferential surface serving as a second presser surface parallel to said second shaft and confronting said first presser surface, and an end surface parallel to said first shaft and having a pin gear facing said first shaft and held in mesh with said spur gear;
   (e) said first and second presser surfaces having closest confronting portions for positioning the coupling elements therebetween, said closest confronting portions being spaced from each other by a first distance equal to the thickness of each of the coupling elements between outer surfaces of legs thereof; and
   (f) one of said first and second rolls being positionally adjustable on said base to vary said first distance.

2. An apparatus according to claim 1, said spur gear comprising a plurality of teeth each having a trapezoidal cross section, said pin gear comprising a plurality of pin teeth each having a frustoconical shape, said pin teeth being disposed along an outer circumferential edge of said end face.

3. An apparatus according to claim 1, said first presser roll having an annular array of partition ridges projecting from said first presser surface for meshing engagement with the legs of the coupling elements, said second presser roll having an annular array of partition ridges projecting from said second presser surface for meshing engagement with the legs of the coupling elements to keep said legs spaced apart.

4. An apparatus according to claim 1, said first presser roll comprising a first disk having said first presser surface and a second disk having said spur gear and coupled to said first disk in concentric relation, said second disk being smaller in diameter than said first disk.

5. An apparatus according to claim 1, said second presser roll comprising a first disk having said pin gear and a second disk having said second presser surface and coupled concentrically to said first disk.

6. An apparatus according to claim 1, said one of said first and second presser rolls having a third presser surface for engagement with coupling heads of said coupling elements disposed between said first and second presser surfaces, further including a third shaft movably mounted on said base and extending parallel to said first shaft and a third presser roll rotatably mounted on said third shaft and having a circumferential surface serving as a fourth presser surface facing said third presser surface for pressing said coupling elements toward said third presser roll, said third and fourth presser surfaces having closest confronting portions for positioning the coupling elements therebetween, said closest confronting portions being spaced from each other by a second distance equal to the length of each of the coupling elements between an end of the coupling head and ends of said legs thereof, and said third presser roll being positionally adjustable on said base to vary said distance.

7. An apparatus according to claim 6, said third presser roll having a radially outwardly opening slot for receiving a slide fastener stringer tape on which the coupling elements are mounted.

* * * * *